April 21, 1931.   T. MIDGLEY   1,802,088

TIRE CONSTRUCTION

Filed Oct. 7, 1920

INVENTOR
Thomas Midgley.
BY
Franklin G. Neal
ATTORNEY

Patented Apr. 21, 1931

1,802,088

UNITED STATES PATENT OFFICE

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS

TIRE CONSTRUCTION

Application filed October 7, 1920. Serial No. 415,383.

This invention relates to improvements in tire casings and to methods of making them. It is particularly directed to so correlating the carcass formation and carcass cross-section as to have each related to the other in a combination for avoiding certain destructive forces found in prior tire casings.

In the formation of a carcass it is customary to build up plies of angularly disposed strain-resisting members bonded by rubber. Adjacent plies are ordinarily arranged with the strain-resisting members crossed at reversed angles with respect to the bead edges in the side walls and tread portions and anchored in the bead portions. This construction as ordinarily found in open bellied tire casings is subjected in use to the uniform expansive pressure of the air in the inner tube. I have found that if the carcass formation is started and finished according to my invention, followed from the beginning to the end, and the plies built so that the carcass cross-section in the vulcanized tire corresponds to what the carcass formation would naturally take under uniform expansive pressure applied to the tire carcass before vulcanization, certain destructive forces will be most effectively avoided when the tire is in use.

To accomplish this result it is necessary to form the carcass so that it will have the same natural shape whether it is actually built under the direct influence of uniform expansive pressure to give it such shape or built in other ways to arrive at the same shape as if it had been built under the direct influence of the expansive pressure and to finish the tire with the carcass in its natural shape.

When the plies of angularly disposed strain-resisting members are anchored at the edges in the bead construction and then subjected to the action of uniform expansive pressure between the beads to bring the plies to tire shape there is a natural shape which any carcass of given formation will assume if not prevented from doing so. If this carcass shape is retained in the vulcanized casing, whether or not it is acquired in distinct stages, or in one operation, under the direct influence of expansive pressure or otherwise, the finished casing ready for use will embody the broadest feature of my invention.

The importance of retaining the natural carcass shape in the finished tire is due to the fact that the natural shape varies widely with variations in the carcass formation. For this reason, unless the natural carcass shape is retained in the finished tire for a given carcass formation the uniform expansive pressure of the inflated tube will constantly tend to force the carcass to the natural shape and therefore tend to separate the strain-resisting members from the vulcanized rubber which constantly tends to hold the carcass in its unnatural position in which the rubber covering is ordinarily vulcanized. Although the rubber will stretch to avoid any immediate separation in the carcass the constant and useless pulling force of the rubber against the strain-resisting members is a destructive force tending to weaken the rubber constantly and to start separation. As soon as separation is once started in a tire casing the destruction is rapid. The destructive force thus brought into play is a substantial one which the practice of my invention will avoid.

To illustrate what I mean by correlating the carcass formation and cross-section in the finished tire casing to avoid destructive forces I will refer to the accompanying drawings, which, although to scale, are illustrative of the principles of my invention rather than of the factory steps which may be used to practice the invention.

Figure 1:
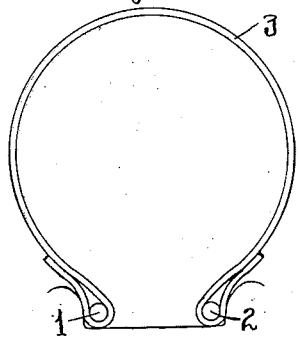
Fig. 1 is drawn substantially to scale and shows a natural carcass shape for a certain carcass formation.
Figure 2:
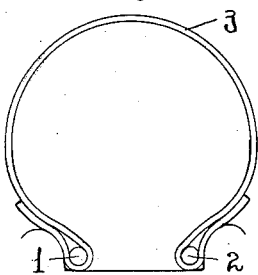
Fig. 2 is a drawn to the same scale and shows a natural carcass shape for a different carcass formation.
Figure 5:
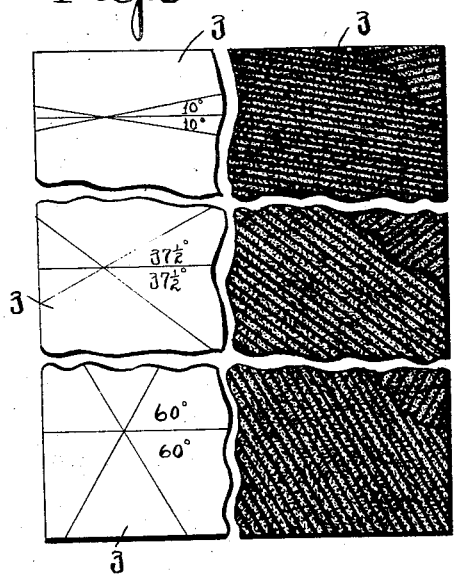
Figure 3:
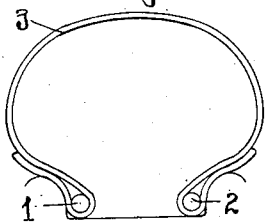
Fig. 3 is drawn to the same scale and shows a natural carcass shape for a still different carcass formation.

Fig. 5 in sections *a*, *b*, and *c*, illustrates the single feature of difference in the formation of the carcass shape as shown in Figs. 1, 2, and 3.

The factory methods of building tires are so well known and so many different specific operations may be used to carry on the practice of my invention that I have omitted a description of them except in certain instances for more clearly defining the invention in its preferred forms.

Referring to the drawings for illustration I may start with a sheet of parallel cords 3, as the strain-resisting members, bonded by unvulcanized rubber alone or together with weak weft threads and with the cords disposed at a cord angle of 10 degrees. This angle (see a, Fig. 5) is measured as the acute angle at which the cords meet a line drawn at right angles to the length of the sheet when in the flat form. The sheet so formed is built into an endless band, on a collapsible pulley, and a second like band is built over the first but with the opposite face on the outside so the cords will cross each other at an angle of 20 degrees. The two bands are stuck together by the tacky rubber and a two ply band or pocket is made. In this illustration the length of the first ply is about 80 1/16 inches and the second about 81 inches while the width is about 14 3/8 inches. Endless inextensible beads 1 and 2 are laid on the band about 10 3/8 inches apart and equally distant from the edges. The latter are folded over the beads and back upon the band to bind the edges. The band is then centered over an inner tube suitable for the size of a tire to contain this size band in its carcass and the tube inflated to about 30 lbs. pressure. The band will then naturally assume the carcass shape or cross-section shown in Fig. 1. In this cross-section the carcass shape indicated is higher than it is wide which relation I have found to exist because the cord angle at which the strain-resisting members are disposed is small.

The cord angle measured, when the band is formed in carcass shape, as the acute angle at which the cord meets a cross-sectional plane is slightly different than it is when measured with the band flat. Other things being equal the cord angle seems to be the controlling factor in determining upon the shape to be given to the tire carcass in the practice of this invention.

A finishing tire casing containing the band just described as a part of its carcass should be vulcanized with its carcass in approximately the same natural shape or cross-section as that determined by the action of the band under the influence of internal expansive pressure.

If the pressure is increased above that given in the specific example the band will be placed under greater tension and the size somewhat increased. The cross section however will still correspond and will be dependent upon the formation of the band and its action under internal expansive pressure and therefore be the natural shape for the band in use.

Fig. 2 illustrates the natural shape that a two ply band will take under the identical conditions are described with respect to the band of Fig. 1 with the single exception that the cords are disposed at a cord angle of 37 1/2 degrees when in the flat band, as shown at b, Fig. 5. The shape is substantially round.

Fig. 3 illustrates the natural shape that a two ply band will take under identical conditions as described with respect to the bands of Figs. 1 and 2 with the single exception that the cords are disposed at a cord angle of 60 degrees when in the flat band, as shown at c, Fig. 5. The shape is substantially wider than it is high.

It is now the universal practice to finish tire casings by vulcanizing them under pressure against a rigid mold or core or both together. To save localized distortion of the carcass as in wrinkles and buckles under vulcanizing pressure the casing is in some methods expanded and pressed against the mold by internal fluid pressure. Whether the pressure is entirely rigid as in full molded tires or only rigid on one side as in the air bag cure the shape or cross section of the tire in prior practice is primarily determined by the mold or core or both together without regard to the natural shape. The carcass is vulcanized and the strain-resisting members are set in the vulcanized rubber with a shape determined by the shape or cross section of the mold cavity designed to finish the tire under vulcanizing pressure against its rigid walls.

Figure 4:
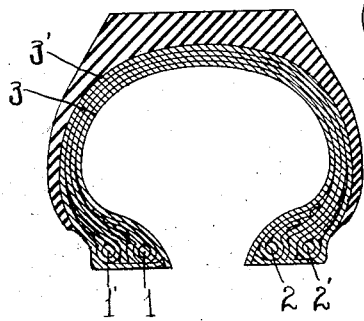
Fig. 4 is a view to show the shape in which a tire carcass having the formation of Fig. 3 should be finished to embody my invention.

From the drawings, which are substantially to scale, it is evident to the naked eye that if the strain-resisting members are disposed in the carcass at a cord angle which would naturally take the shape of Fig. 1 and then the tire finished in a mold which determines the carcass shape of Fig. 4 the carcass will be substantially distorted from its natural shape. Under the influence of uniform expansive pressure when in use the strain-resisting members will constantly tend to take their natural shape of Fig. 1 while the vulcanized rubber covering them will constantly tend to hold them in the shape in which they were set with the rubber under vulcanizing pressure. This action of the rubber and the carcass strain-resisting members will last as long as the rubber retains its elasticity. The strain will tend constantly to separate the cord from the rubber. This kind of a strain or force is destructive and useless. My invention is designed to avoid the action of such a destructive force between the strain-resisting members and the rubber.

It will be clear from the drawings and description that my invention may be practiced by finishing the carcass in that cross sectional form which its angularly disposed strain-resisting members would tend to determine with the carcass under uniform expansion pressure. For example a carcass having the natural shape of the band shown in Figure 3 would by this invention be finished by vulcanization under pressure in a mold having a molding cavity to produce the tire with a carcass cross section like that of the tire shown in Figure 4. The pressure necessary for vulcanization is less than in prior practice because the carcass is cured in the natural shape without distortion. A carcass having a natural shape like that shown in Figure 2 would be completed in a mold having a cavity to produce a tire with a corresponding carcass shape. So a carcass with the natural shape shown in Figure 1 would be finished under vulcanizing pressure to retain the corresponding shape. The natural shape into which the carcass formation is built should not be departed from during vulcanization under pressure. The size of the carcass might be changed slightly, as when vulcanized in a mold with uniform expansive pressure but the natural shape must be retained.

The invention is carried out in its preferred form by disposing the strain-resisting members at the proper cord angle to determine the natural carcass shape desired, building the carcass to said shape by laminating sheets of said members and then completing the tire with the carcass in its natural shape. There are several ways in which the carcass may be satisfactorily built in the desired formation prior to vulcanization.

I may practice my invention by expanding bands or pockets (preferably containing two plies) substantially to the natural carcass shape and laying them successively upon a correspondingly shaped core or form. The bands may be stretched over the form, shaped down at the edges, and anchored into the beads so that the final result is substantially the same as if they had originally been expanded to the natural shape as indicated in the drawings. When the desired number of plies are applied to the form, the beads built in to anchor them and the covering rubber applied the tire is ready to be finished. A mold may then be applied to the outside of the tire as is usual in making a full molded tire but this mold with the core should form a cavity which will take the tire on the core without changing the carcass shape when the two halves of the mold are pressed together as is usual in the vulcanizing operation. Or the core may be removed from the tire casing and an expansible tube inserted in its place and the tire then finished in a mold which will hold the tire against uniform expansive pressure from fluid in the tube but without forcing the carcass out of the shape natural for such pressure.

I prefer to expand the laminated plies in separate sections and then laminate the sections after they have been substantially shaped. In this way the natural shape of the carcass is built into the structure in a better manner than if the whole structure were expanded to shape at one time. The broad invention however includes the operations of building the whole carcass in substantially flat form with beads in place, then expanding it by uniform expansive pressure to its natural shape under the influence of the cord angle of the strain-resisting members, and finishing the tire while retaining the natural shape of the carcass determined by uniform expansive pressure.

Instead of expanding the endless bands or pockets to carcass shape as described I may expand them uniformly in flat annular form, center them over a core with a cross-section of the natural shape for the carcass, release the band in its flat form on the core, and then permit it to contract to take the core form. By thus laminating the carcass and anchoring the edges in a bead construction under uniform tension conditions the desired object of building the carcass to its own natural shape is attained. It is then built into the final tire form as described while retaining the natural shape. This method of expanding the bands and applying them to a core is more specifically described in my copending application Serial No. 301,782, filed June 4, 1919.

The invention may also be worked by building the carcass up on a core having the natural shape determined as described provided the strain-resisting members are disposed on the core by hand or by machine or by any method under substantially the same cord angle and uniform tension conditions as if they were so disposed by expanding the laminations in band form according to my specific example and then finished in tire form by vulcanization while under conditions to retain the natural shape. These conditions I have already described so that they may readily be followed by any skilled tire builder.

The drawings illustrate the wide range of tire shapes that may be chosen by one following the invention. The shapes between the extremes shown, as well as others, may be readily obtained by changing the cord angle according to the natural shape desired. I have found that the cord angle is the controlling factor for the natural shape as long as other factors are constant. If the circumference and width between the bound edges of the endless bands laminated into the carcass form are changed then the same cord angle will not produce the same shape. However for a desired tire the builder knows the proper circumference for the laminations of his carcass, their widths, and the degree of tension he desires his strain-resisting members to have in the building operations. With these determined the natural shape of the tire will be controlled by the cord angle at which the strain-resisting members are disposed in the laminations. Thus the practice of my invention by which one builds this natural shape into the tire carcass and retains it as a corresponding shape in the final tire carcass may be readily followed through a very wide range of tire sizes and shapes.

The angles heretofore referred to and indicated in Fig. 5 of the drawing have been measured in accordance with one standard practice from a line at right angles to the length of the cord strips, and the angles in the finished tire heretofore referred to have been measured from a line transverse to the tire, or in other words from a plane passing through the axis of the tire. If it is desired to measure these angles, in accordance with a certain other standard practice, from the edge of the strip or from the circumferential line through the middle of the tire tread, or from a tangent to the bead line, it will be necessary to subtract the angles given from 90°. The two methods of measuring angles give results which are complementary to each other and with this understanding are capable of interchangeable use.

I claim:

1. A pneumatic tire having a laminated carcass of oppositely-biased threads and rubber vulcanized in oblate, oval, cross-sectional form, the threads having an angularity, which in the tread portion is less than 40° to the middle circumferential line, tending to maintain said carcass in the oval form when inflated.

2. A pneumatic tire according to claim 1, whose radial depth when inflated is at least as great as when not inflated.

3. A beaded pneumatic tire casing with bulging sides, having a laminated carcass vulcanized in oblate, oval, cross-sectional form and made of crossed rubberized threads extending obliquely throughout their length from bead to bead, the threads in the tread portion having an angle to the middle circumferential line of less than 40° and the threads at the beads having an angle greater than the angle in the tread portion.

4. A pneumatic tire casing according to claim 3, having a carcass made from plies of rubberized threads which, when the plies are flat, lie at an angle to their edges not greater, substantially, than 40°, said carcass being of oblate, oval section both when deflated and when inflated.

5. A beaded pneumatic tire having a carcass vulcanized in a pronounced oblate, oval cross-sectional form and maintained substantially in said form, when inflated, essentially by reason of the angularity of its diagonal threads, said carcass comprising oppositely-biased plies of rubberized threads extending diagonally throughout their length from bead to bead, the threads having, in the tread, an angularity of less than 35° to the middle circumferential line and having, at the beads, a greater angularity to the edges of the casing.

6. The method of making pneumatic tires which comprises building the carcass with rubberized, oppositely-biased thread plies having an oblate, ovel-forming angularity of threads to the circumferential lines of the tire, which is less in the tread than in the sidewalls, and not substantially greater than 40° in the tread and vulcanizing the carcass in oblate, oval, cross-sectional form.

7. The method of making pneumatic tire casings which comprises building the carcass on a core of oblate, oval, cross-sectional form, with oppositely-biased strips of rubberized threads in which the threads, when the strips are flat, lie at an angle to the edges of between 30° and 40°, stretching the plies at the tread and condensing them at the sides, forming bead edges on the carcass, and vulcanizing the casing in oblate, oval form with bulging sides substantially farther apart than said bead edges.

THOMAS MIDGLEY.